(12) United States Patent
Wright

(10) Patent No.: US 9,022,223 B1
(45) Date of Patent: May 5, 2015

(54) SELF-CLEANING WATER FILTRATION SYSTEM

(71) Applicant: Instapure Brands, Inc., Loveland, CO (US)

(72) Inventor: William Scott Wright, Loveland, CO (US)

(73) Assignee: Instapure Brands, Inc., Loveland, CO (US)

(*) Notice: Subject to any disclaimer, the term of this patent is extended or adjusted under 35 U.S.C. 154(b) by 0 days.

(21) Appl. No.: 14/599,046

(22) Filed: Jan. 16, 2015

Related U.S. Application Data

(63) Continuation-in-part of application No. PCT/US2013/052041, filed on Jul. 25, 2013, which is a continuation of application No. 13/565,322, filed on Aug. 2, 2012, now Pat. No. 8,323,490.

(51) Int. Cl.
*B01D 29/05* (2006.01)
*B01D 29/64* (2006.01)
(Continued)

(52) U.S. Cl.
CPC ........ *B01D 29/6407* (2013.01); *B01D 29/6469* (2013.01); *B01D 2029/075* (2013.01);
(Continued)

(58) Field of Classification Search
CPC ........ B01D 29/17; B01D 29/25; B01D 29/64; B01D 29/6407; B01D 29/6423; B01D 29/6469; B01D 29/6484; B01D 65/02; B01D 33/67; B01D 2201/0415; B01D 2201/0423; B01D 2201/08; B01D 2201/304; B01D 2313/02; B01D 2313/025; B01D 2313/04; B01D 2313/50; C02F 1/002; C02F 1/003; C02F 1/283; C02F 1/444; C02F 2307/02; C02F 2307/04; C02F 2313/02; C02F 2313/025; C02F 2313/04; C02F 2313/50

USPC ........ 210/232, 257.1, 258, 263, 416.1, 416.3, 210/446, 449, 459, 460, 461, 321.87, 321.6, 210/321.88, 321.69, 413, 450, 396, 464, 210/469, 473–477, 482; 222/282, 333, 402, 222/189.06, 189.11, 189.09
See application file for complete search history.

(56) References Cited

U.S. PATENT DOCUMENTS

| 63,090 A | 3/1867 | Phillips |
|---|---|---|
| 629,387 A | 7/1899 | Nordtmeyer |

(Continued)

FOREIGN PATENT DOCUMENTS

| CN | 1548209 A | 11/2004 |
|---|---|---|
| CN | 2704406 Y | 6/2005 |

(Continued)

OTHER PUBLICATIONS

Katadyn Hiker Pro Microfilter—Item #: 81917, CAMPMOR website, http://www.campmor.com/outdoor/gear/Product_81917?cm_vc=PDPZ1 accessed on Apr. 24, 2012.

(Continued)

*Primary Examiner* — Joseph Drodge
(74) *Attorney, Agent, or Firm* — Nilay J. Choksi; Smith & Hopen, P.A.

(57) ABSTRACT

A compact, piston-driven water filtration system with annular cleaning device/brush. The filter apparatus operates based on a piston-driven pressure system where the piston is threadably mated to a water reservoir. Threading of the piston forces a sleeve connected thereto within the reservoir to force water through any suitable water filter (e.g. carbon-based, ceramic, micro- and/or nano-membrane materials) on the opposite side of the reservoir from the threadably-mated piston within the reservoir. The sleeve connected to the piston within the interior of the reservoir includes a cleaning device (e.g., brush, scraper, pad, etc.) on a distal end of the sleeve inside the water reservoir. The annular brush has an inner diameter smaller than that of the sleeve, such that as the piston is threaded into and out of the reservoir, the sleeve moves toward, over, and away from the filter, and the brush scrapes/scrubs/cleans the exterior of the filter for cleansing.

16 Claims, 5 Drawing Sheets

(51) Int. Cl.
| | |
|---|---|
| *B01D 65/02* | (2006.01) |
| *C02F 1/00* | (2006.01) |
| *C02F 1/44* | (2006.01) |
| *B01D 29/25* | (2006.01) |
| *B01D 29/00* | (2006.01) |
| *B01D 29/17* | (2006.01) |
| *B01D 29/075* | (2006.01) |

(52) U.S. Cl.
CPC ............ *B01D29/25* (2013.01); *B01D 29/0029* (2013.01); *B01D 29/17* (2013.01); *B01D 65/02* (2013.01); *B01D 29/6484* (2013.01); *C02F 1/444* (2013.01); *C02F 1/002* (2013.01); *C02F 2307/02* (2013.01); *B01D 2201/304* (2013.01); *B01D 2313/04* (2013.01); *B01D 2201/0423* (2013.01); *B01D 2321/30* (2013.01)

(56) References Cited

U.S. PATENT DOCUMENTS

| | | | | |
|---|---|---|---|---|
| 663,271 | A | | 12/1900 | Hamilton |
| 978,265 | A | | 12/1910 | Barnett |
| 2,436,077 | A | * | 2/1948 | Robertson ................ 210/317 |
| 2,507,893 | A | * | 5/1950 | Lisle ......................... 210/470 |
| 3,286,843 | A | | 11/1966 | Kraissl, Jr. |
| 3,379,312 | A | * | 4/1968 | Brown ...................... 210/415 |
| 3,454,164 | A | * | 7/1969 | Asper ........................ 210/108 |
| 3,850,802 | A | | 11/1974 | Berger |
| 4,003,837 | A | | 1/1977 | Osborne |
| 4,397,177 | A | | 8/1983 | Cain |
| 4,477,347 | A | | 10/1984 | Sylva |
| 4,645,591 | A | | 2/1987 | Gerulis |
| 5,198,111 | A | | 3/1993 | Davis |
| 5,527,462 | A | | 6/1996 | Davis et al. |
| 5,569,383 | A | | 10/1996 | Vander Ark, Jr. et al. |
| 5,595,655 | A | | 1/1997 | Steiner et al. |
| 5,733,448 | A | | 3/1998 | Kaura |
| 5,914,045 | A | | 6/1999 | Palmer |
| 6,187,177 | B1 | * | 2/2001 | Ogburn ....................... 210/85 |
| 6,383,384 | B1 | | 5/2002 | Anderson |
| 6,478,956 | B2 | | 11/2002 | Kaura |
| 6,575,307 | B2 | | 6/2003 | Lockwood |
| 7,014,817 | B1 | | 3/2006 | Hand et al. |
| 7,413,653 | B2 | | 8/2008 | Powell |
| 8,323,490 | B1 | | 12/2012 | Wright et al. |
| 2003/0164333 | A1 | | 9/2003 | Nohren, Jr. et al. |
| 2003/0173279 | A1 | | 9/2003 | Aste |
| 2066/0273000 | | | 12/2006 | Chung |
| 2007/0045169 | A1 | * | 3/2007 | Powell ..................... 210/416.3 |
| 2011/0233119 | A1 | * | 9/2011 | Nelson ....................... 210/117 |

FOREIGN PATENT DOCUMENTS

| | | |
|---|---|---|
| CN | 201008766 Y | 1/2008 |
| CN | 101539210 A | 9/2009 |
| CN | 201337844 Y | 11/2009 |
| CN | 201366270 Y | 12/2009 |
| CN | 201399272 Y | 2/2010 |
| CN | 201823375 U | 5/2011 |
| CN | 202762177 U | 3/2013 |
| CN | 202876484 U | 4/2013 |
| CN | 202876488 U | 4/2013 |
| CN | 203060935 U | 7/2013 |
| CN | 203154931 U | 8/2013 |
| GB | 1415033 A | 11/1975 |
| GB | 2099326 A | 12/1982 |
| JP | 11051832 A | 2/1999 |
| WO | 8201666 A1 | 5/1982 |
| WO | 9213700 A1 | 8/1992 |
| WO | 9310879 A1 | 6/1993 |
| WO | 9522397 A1 | 8/1995 |
| WO | 0057985 A1 | 10/2000 |
| WO | 2010011984 A2 | 1/2010 |

OTHER PUBLICATIONS

Katadyn Vario Microfilter—Item #: 82400, CAMPMOR website, http://www.campmor.com/outdoor/gear/Product_82400?cm_vc=PDPZ1 accessed on Apr. 24, 2012.
MSR Miniworks EX Water Filter—Item #: 87779, CAMPMOR website, http://www.campmor.com/msr-miniworks-ex-water-filter.shtml?source=Cl&ci_src=14110944&ci_sku=87779WC accessed on Apr. 24, 2012.
Microbiological Water Purifiers Overview: NSF Protocol P231. NSF International. 2003: 1-50.
Translation of foreign reference CN 101539210 A (filing date: Apr. 21, 2009) with a Publication Date of Sep. 23, 2009; Applicant: Liansu Technology Industrial Co. Ltd.
Translation of foreign reference CN 1548209 A (filing date: May 3, 2003) with a Publication Date of Nov. 24, 2004; Applicant: Yuanjia Guo.
Translation of foreign reference CN 201823375 A (filing date: Sep. 11, 2010) with a Publication Date of May 11, 2011; Applicant: Environmental Protection Technology Co., Ltd.
Translation of foreign reference CN 202762177 U (thing date: Sep. 5, 2012) with a Publication Date of Mar. 6, 2013; Applicant: Energy-saving projects in Tianjin Green Vision Equipment Co., Ltd.
Translation of foreign reference CN 202876484 U (filing date: Nov. 12, 2012) with a Publication Date of Apr. 17, 2013; Applicant: Pipe-line Equipment Co., Ltd.
Translation of foreign reference CN 202876488 U (thing date: Nov. 12, 2012) with a Publication Date of Apr. 17, 2013; Applicant: Pipe-line Equipment Co., Ltd.
Translation of foreign reference CN 203060935 U (filing date: Nov. 28, 2011) with a Publication Date of Jul. 17, 2013; Applicant: Land-saving Equipment Co.
Translation of foreign reference CN 203154931 U (filing date: Jan. 21, 2013) with a Publication Date of Aug. 28, 2013; Applicant: Qinhuangdao Tonglida Environmental Energy Engineering Co Ltd.
Translation of foreign reference CN 201337844 Y (filing date: Nov. 13, 2008) with a Publication Date of Nov. 4, 2008; Applicant: University Jianghan
Translation of foreign reference CN 201366270 Y (filing date Feb. 5, 2009) with a Publication Date of Dec. 23, 2009; Applicant: Tang Qinghua
Translation of foreign reference CN 201399272Y (filing date: Apr. 2, 2009) with a Publication Date of Feb. 10, 2010; Applicant: Huang Songqing.
Translation of foreign reference CN 2704406 Y (filing date: May 19, 2004) with a Publication Date of Jun. 15, 2005; Applicant: Shougang Dongxing Spare Parts.
International Search Report and Written Opinion for PCT/US2013/052041 (filing date: Jul. 25, 2013) with a mailing date of Nov. 12, 2013; Applicant: Instapure Brands, Inc. et al.

* cited by examiner

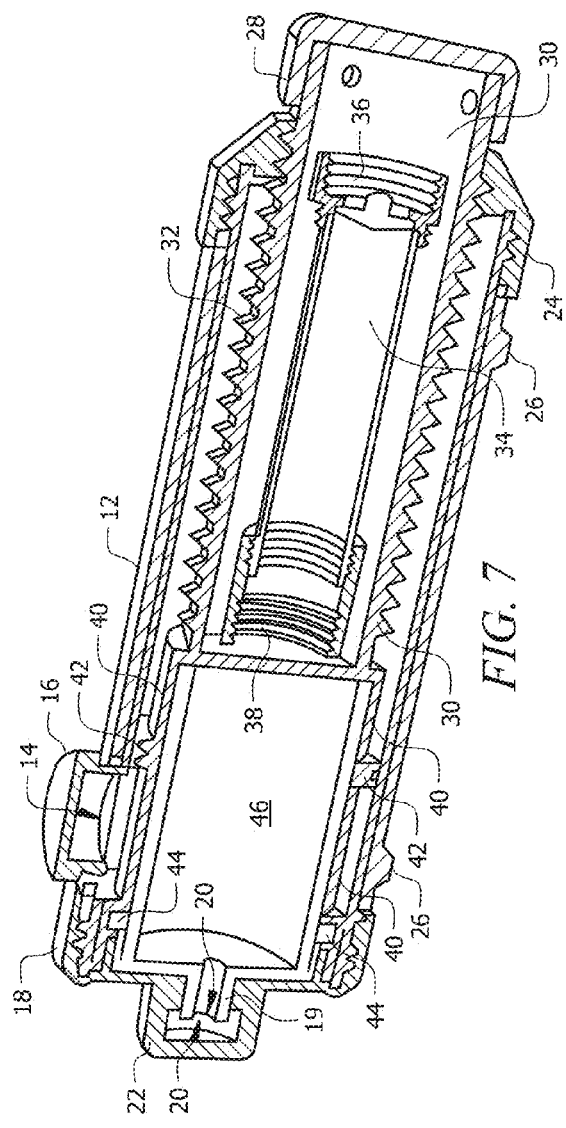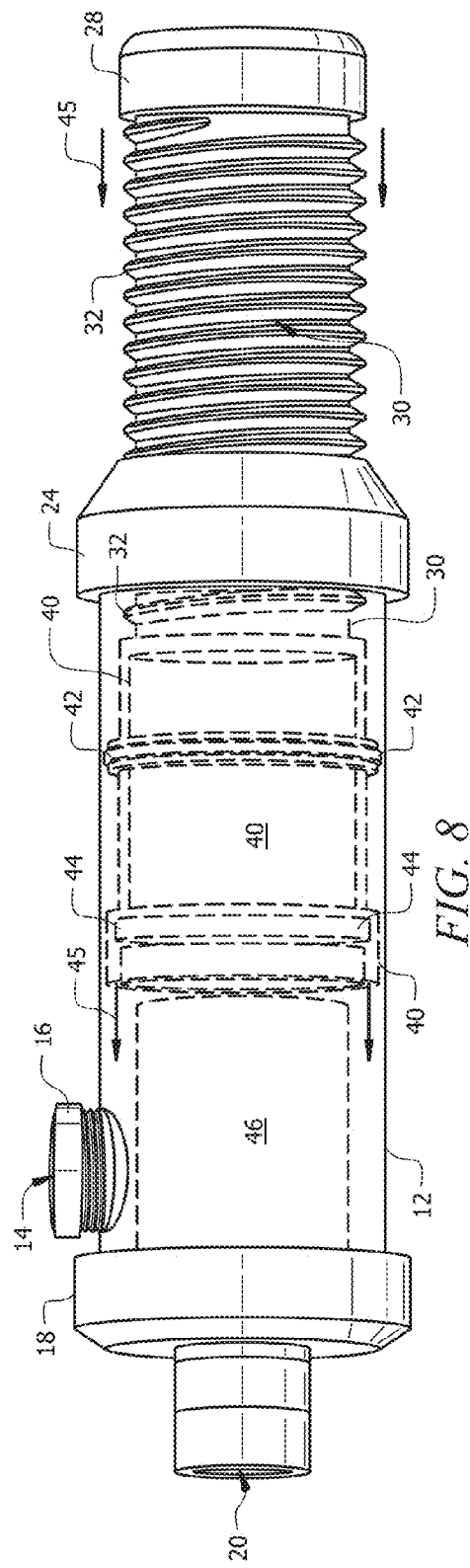

SELF-CLEANING WATER FILTRATION SYSTEM

CROSS-REFERENCE TO RELATED APPLICATIONS

This nonprovisional patent application is a continuation-in-part of and claims priority to PCT Patent Application No. PCT/US2013/052041, entitled "Pressurized Water Filtration System", filed Jul. 25, 2013, which claims priority to U.S. Nonprovisional patent application Ser. No. 13/565,322, entitled "Pressurized Water Filtration System", filed Aug. 2, 2012, now U.S. Pat. No. 8,323,490, both of which are incorporated herein by reference in their entireties.

BACKGROUND OF THE INVENTION

1. Field of the Invention

This invention relates, generally, to water filtration at the point-of-use for the reduction of undesirable contaminants and increase in the quality of taste and odor. More particularly, it relates to portable water filtration using a self-cleaning water filtration system with threaded piston that allows the system or its user to easily generate water pressure capable of achieving high quality water filtration while simultaneously cleaning the filter material.

2. Description of the Prior Art

Municipal water is treated with chlorine or chloramine in order to kill bacteria and viruses. To address consumer concern over taste and odor, as well as potential health effects caused by the excessive consumption of chlorine, stationary point-of-use water filtration systems designed to reduce chlorine, using granular activated carbon (GAC) and often certified against NSF/ANSI Standard 42, are well-known and have been effective in the art. Examples include tap water filters attached to the end of a water faucet, said filters filtering water on-demand; water filters that are installed in the water source line, said filters filtering all or part of the water flowing through the line; and refrigerator water filters that provide water filtration prior to the production of ice or delivery of water on-demand.

Municipal water treatment is an imperfect science. The levels of chlorine and chloramine may be inconsistent and are not always fully effective against microbial cysts, such as giardia and cryptosporidium. Even with treatment, some water supplies contain unsafe levels of lead from aging plumbing fixtures, as well as mercury and Volatile Organic Compounds (VOCs) introduced into the water supply through ground water leaching of industrial pollutants or agricultural chemicals. To address these concerns, manufacturers of household water filtration systems began to develop solid carbon block based filters with micro pores small enough to eliminate substantially all microbial cysts. Additionally different additives can be combined with the carbon block formula to allow for adsorption of undesirable contaminants such as lead, mercury and VOCs. These stationary systems connected to household plumbing benefit from the water pressure delivered by the municipal water systems, thereby producing the force required to push the water through the solid carbon block, achieving a reduction level of contaminants compliant with NSF/ANSI Standard 53.

Portable water filtration systems for use when hiking or camping are also known and typically use a carbon, ceramic or combination filter with a hand pump or lever manually driven by the user to draw water from a source and/or create pressure through the filtration system, expelling filtered water from the filter media. These systems are designed to reduce bacteria, protozoa and viruses that are commonly found in untreated water sources. However, these systems suffer from slow flow of water, require a high degree of maintenance with regular cleaning of their ceramic filter, and demand a large work effort on the part of the user in relation to the amount of filtered water produced.

Another type of portable water filtration system is a specially designed straw that incorporates one or more water filtration media, such as a hollow fiber membrane ("HFM"). Originally designed for third world countries where water quality is very low in order to facilitate reduction of bacteria and viruses, these filter straws are seeing more popularity as an alternative to cumbersome hiking and camping water filtration systems. However, filter straws are not conducive to filtering water for cooking, not usable for filtering water to be stored for later use (e.g., for use while away from a river, lake, or other water source), and are not designed for shared use due to cross-contamination concerns. Additionally, these straws do not address taste or odor, as HFM does not necessarily absorb particulates but simply stops the flow of particulates larger than its pore size.

Another filtering methodology known in the art is the incorporation of a portable water filter into plastic squeeze bottles. Because plastic squeeze bottles can generate only minimal pressure, granular activated carbon is the primary filtration media used since these devices produce insufficient and/or unregulated pressure to drive water through a ceramic filter or solid carbon block, which are substantially denser. Thus, the highest rating this type of water filter bottle can receive is NSF/ANSI Standard 42. This degree of water filtration is not sufficient to address consumer concerns regarding other contaminants in their water that are embodied in NSF/ANSI Standard 53—such contaminants include lead, mercury, industrial pollutants, and agricultural chemicals.

The prior art described herein only partially addresses a traveler's portable water filtration needs, forcing one to choose between a system designed for municipal water where chlorine, lead, industrial pollutants and agricultural chemicals are of primary concern under NSF/ANSI Standard 53 and a system designed for untreated (i.e., non-potable) water where the potential for bacteria, protozoa and viruses are of significant, if not primary, concern.

The prior art has not shown the application of a portable filtration device designed specifically to meet NSF/ANSI P231 Protocol. "Microbiological Water Purifiers Overview: Protocol P231", which is incorporated by reference herein, addresses systems that use chemical, mechanical, and/or physical technologies to filter and treat waters of unknown microbiological quality, but that are presumed to be potable. Filtration to this Protocol would meet the needs of travelers visiting countries where the municipal water supply is deemed to be "Potable" but may not meet or equal the quality to which they are accustomed or acclimated. To date, conventional compact, portable water filtration devices have been unable to meet the standards for this certification. The only systems that remain close to the standards are chlorinators that simply add chlorine to the water.

Prior art has attempted to address the apparent conundrum with little success. U.S. Pat. No. 978,265 granted December 1910, to Barnett describes a hand pump that pressurizes liquid through an outlet pipe via use of a hand-rotated, threadably-engaged piston applying a force onto the liquid. While useful for a method of providing pressure Barnett fails to address the use of the pressure for filtration purposes.

U.S. Pat. No. 4,397,177 granted August 1983, to Cain herein incorporated by reference, addresses a hydraulic filter press apparatus for filtering samples of drilling mud. Cain uses a piston threadably engaged to a pump body. As the piston rotates, engaging the threads therearound, the fluid within the pump body is pressurized into the lower portion or the apparatus. The lower portion of the apparatus contains a fine metal screen, a disc filter paper, and a liquid outlet. While Cain is a filter of sorts, it lacks in portability and functionality for use in water filtration. The primary focus of Cain is in Obtaining mud samples free of water as opposed to water free of harmful contaminants.

Along the lines of Cain, several pressure filter patents exist that concern filtration of substances, but lack the necessities of drinkable water purification and portability. U.S. Pat. No. 63,090 to Phillips describes an improved press strainer, or fruit strainer, that uses a threaded screw that, when rotated and threaded into a cylinder, pressurizes and filters food items, such as fruit or butter. The cylinder is threaded along its lower portion as well to fit an output funnel. U.S. Pat. No. 7,014,817 to Hand, et al. describes a remote zero headspace extractor that places a sampling container within a stainless steel vessel. A manual piston is disposed within the vessel and underneath the sampling container. As the piston is threaded, pressure is exerted on the sampling container, which pushes the extract within the sampling container through a filter and into a bag or bottle. PCT Patent App. Pub. No. WO 1992013700A1 to Tsutsuini describes a hot runner mold apparatus that utilizes a screw plunger to pressurize and force a plasticized melt into a filter that removes any impurities in the metered melt. All of these patents lack the purpose, direction and capability of producing highly filtered drinking water.

Filters that use pressure to filter water lack the tools to be truly compact, simplistic in application and receive ratings of NSF/ANSI Standard 53. Chinese Patent App. No. CN201008766Y to Song describes an apparatus for treating water via a portable vacuum filter that is actuated by rotating a threadably-engaged piston. Japanese Patent App. No. JP11051832A to Yutaka, et al. describes an apparatus that uses a rotatable shaft coupled to a piston to apply pressure to a sample of soil, the water within which is siphoned through a filter into a container. U.S. Patent App. Pub. No. 2006/0273000 to Chung describes a "portable" water filtering device that uses a threaded piston to apply pressure onto water, forcing the water across a series of tubing and into a filtering tube. Sufficient pressure must be provided to force the water up the filtering tube and into the dispensing pipe. PCT Patent App. Pub. No. WO 2000057985A1 to Brebner, et al. describes a water filtration device including a filter member that is pressed into container via threaded piston rod. Initially, water is filled within container underneath filter member. Then the filter member is driven down through the volume of water, urging the water up through filter medium. The structure is a mesh screen that protects the water from airborne contaminants.

These various embodiments of pressurized filters span a period of over one-hundred years. They span from mining to organic, from water removal to water filtration. Yet throughout this evolution there lacks a compact, portable, easy to use, pressurized filtration device that achieves optimum filtration, via filters capable of achieving ratings of NSF/ANSI Standard 42, NSF/ANSI Standard 53, and NSF/ANSI Protocol P231.

Even with current technology that uses thread-forced pistons to push water through the filter, such as U.S. Pat. No. 8,323,490 to the current inventor, which is incorporated herein by reference, the art still deals with certain issues of cleaning the filter medium so that the filter medium can be used for a longer period of time. For example, the prior art, such as Chinese Patent App. Nos. CN 1548209 A to Jiaguo and CN 201823375 U to Chen et al, discusses fixed cleaning brushes with the filtration systems that extend the length of the filter. Also, U.S. Pat. No. 3,286,843 Kraissl describes a filter having two fixed wire brushes extending the longitudinal length of the reservoir with the filter positioned between the brushes. The filter is cleaned by manually rotating the filter allowing the brushes to clean the surface of the filter. With a different configuration, Chinese Patent App. No. CN 101539210 A to Liang discusses self-cleaning filter water faucet that sequentially includes an upper transfer channel, a filter disk, and a lower transfer channel. The filter disk includes a filter mesh, and the upper and lower transfer channels include fixed scraping strips/brushes for scraping the top and bottom of the filter disk through the filter mesh. Further, PCT Application No. WO 93/10879 to Arthur discusses a filter assembly that includes filter elements contained within an apertured sleeve, where the sleeve supports two fixed cleaning brushes for scrubbing or cleaning the outside of the filter elements.

Additionally, certain apparatuses of the prior art discuss cleaning the interior of the filter, rather than the exterior. Examples include U.S. Pat. No. 5,569,383 to Kaiser et al., U.S. Pat. Nos. 5,198,111 and 5,527,462 to Davis, Chinese Patent No. CN 202762177 U to Lei, Chinese Patent Nos. CN 202876488 and CN 202876484 U to Wei et al, Chinese Patent No. CN 203060935 U to Huanfang et al., and Chinese Patent No. CN 203154931 U Many of these references describe a filter having a cleaning unit that is axially moveable with respect to the filter within the filter. The apparatuses include a filter cleaner to clean the interior of the filter surface; in other words, the filter cleaner is the male component, and the filter itself is the female component.

Accordingly, what is needed is a self-cleaning portable water filter that can generate sufficient pressure to produce the desired or required quality of filtration. However, in view of the art considered as a whole at the time the present invention was made, it was not obvious to those of ordinary skill how the art could be advanced.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular (problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for a self-cleaning, sufficiently-pressured portable water filtration system that both drives water through a micro-pore filtration medium and extends the life of the filtration medium is now, met by a new, useful and nonobvious invention.

In an embodiment, the current invention is a water filtration system. The system includes a substantially hollow water reservoir, a piston apparatus threadably disposed through a proximal end of the reservoir, a sleeve connected to and extending from a distal end of the piston apparatus, and a water filter positioned at a distal end of the water reservoir. An entry port is positioned on the water reservoir for supplying from an environment external to the reservoir to an interior of the reservoir. Threads or ribs are disposed at least partially along an extent of the piston apparatus and threadably engaged to another set of threads or ribs, so that the piston apparatus can move in a proximal-distal direction by engaging the threads. The sleeve has a diameter or width (if non-circular in shape) that is larger than a diameter or width of the water filter, though both the sleeve and water filter should have a similar shape so that the sleeve can "hug" the water filter. As the piston apparatus is threaded distally, the water filter enters the distal end of the sleeve and begins to enter the interior of the sleeve as the sleeve begins to surround the water filter. A cleaning mechanism (e.g., brush, scraper, pad, etc.) is disposed along an inner extent of the sleeve so that as the sleeve continues moving distally down the water filter, the cleaning mechanism contacts the external surface of the water filter in order to brush, scrape, or otherwise clean the external surface of the water filter (by whisking away any debris on the filter). As such, the water filter and cleaning mechanism have a male-female relationship where the water filter is the male component that enters the female cleaning mechanism as the piston apparatus and sleeve move distally. Pressure on the fluid can be increased or decreased by engaging the threads of the piston, such that an increase of pressure on the fluid drives the fluid distally through the water filter.

The cleaning mechanism may be disposed around an inner circumference of the sleeve, so that the cleaning mechanism would brush or scrape the external surface of the water filter.

The cleaning mechanism may have a length that is smaller than the length of the water filter.

A filter frame may be disposed on the distal end of the reservoir and positioned in distal relation to the water filter in order to secure the water filter within the water reservoir. The filter frame has an aperture aligned with the exit port to allow the filtered water to exit the filtration system. In a further embodiment, the filter frame may be removable from the distal end of the reservoir to allow the water filter to be removed from the reservoir. In another embodiment, the filter frame may include a circular threaded extension extending distally from the filter frame.

The piston apparatus may be substantially hollow and structured to enclose an additional water filter.

A piston frame may be secured to the proximal end of the reservoir, where the piston frame includes the threads that threadably engage the threads on the piston apparatus. In a further embodiment, the piston frame may be removable from the proximal end of the reservoir to allow the piston apparatus to be removed from the reservoir.

A sealing mechanism may be disposed around the outer circumference of the sleeve to seal off a space in the reservoir proximal to the sealing mechanism. In a further embodiment, the sealing mechanism may be disposed in proximal relation to at least a portion of the cleaning mechanism along the sleeve. In an alternate embodiment, the entry port may be positioned in distal relation to the sealing mechanism so that fluid can enter the interior of the reservoir through the entry port but cannot pass through the sealing mechanism into the space in the reservoir proximal to the sealing mechanism. In yet another embodiment, the sealing mechanism may be an O-ring secured to and disposed around the outer circumference of the sleeve.

The cleaning mechanism may be an annular brush, scraper, or pad disposed around the inner circumference of the sleeve. Optionally if the sealing mechanism is an O-ring, the cleaning mechanism would be disposed in distal relation to the O-ring. In this particular case, the entry port would be positioned between the cleaning mechanism and the O-ring along the wall of the reservoir.

In a separate embodiment, the current invention is a water filtration system that may include one or more, or even all, of the foregoing features described above.

These and other important Objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 7 is a perspective 50% cross-sectional view of an embodiment of the current invention with piston in a compacted position.

FIG. 8 is an external wireframe view of an embodiment of the current invention with piston in an expanded position.

Figure 1:
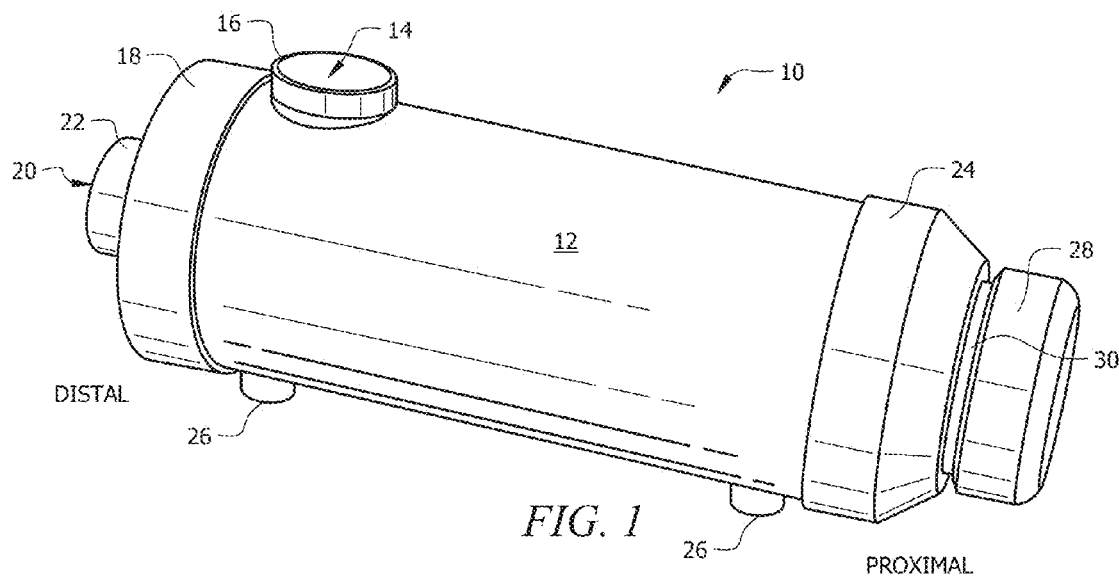
FIG. 1 is an exterior view of an embodiment of the current invention with piston in a compacted position.

DETAILED DESCRIPTION OF THE PREFERRED EMBODIMENT in the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The term "distal" refers to a direction or position closer to an exit port of the water filtration system, or further away from an end-user. The term "proximal" refers to a direction or position closer to an end of the piston external to the water reservoir, or closer to an end-user.

In an embodiment, the current invention includes a compact, portable, variable-pressure (about 1-200 psi, e.g., 10 psi), piston-driven water filtration system with annular cleaning device/brush for superficially cleaning the exterior of the filter material thereby removing and or releasing the undissolved and dissolved solids greater than the filter pore size from the surface of the filter media reducing the "plugging effect" the filter apparatus operates primarily based on a piston-driven pressure system where the piston is threadably mated to a water reservoir. Threading of the hollow piston distally forces a sleeve connected thereto within the reservoir to begin surrounding a distally-positioned water filter (e.g., carbon-based, ceramic, micro- and/or nano-membrane materials including but not limited to HFM, micro-porous plastic, etc.) and in turn, force water through the water filter on the opposite side of the reservoir from the threadably-mated piston. The sleeve connected to the piston and extending distally therefrom within the interior of the reservoir includes a cleaning device (e.g., brush, scraper, pad, etc.) near the distal end of the sleeve that is located inside the water reservoir. In an embodiment, the cleaning device is an annular brush/scraper that is disposed around the circumference of the sleeve. Accordingly, the annular brush has a diameter slightly larger than that of the filter, such that as the piston is threaded into (distally) and out of (proximally) the reservoir, the sleeve moves toward and along the filter (distal direction) and away from and along the filter (proximal direction), and the brush scrapes or scrubs against the exterior of the filter to clean it.

Form and material of the water filter can be anything suitable in the art. Examples of material include, but are not limited to, carbon, ceramic, micro- and/or nano-membrane materials including but not limited to HFM, and micro-porous plastic. Carbon may a include pore size of about 0.5 µm, ceramic may include a pore size of about 0.03 to about 0.05 µm, and micro- and/or nano-membrane materials including but not limited to HFM may include a pore size of about 0.01 µm. As the pore size decreases in the filter media, the amount of pressure required to be applied onto the water increases. As in the conventional art, water flows through the filter mass in a purification process, in which the filter mass captures or prevents flow of particulates larger than its pore size, and allows the fluid (i.e., water) without captured particulate to flow through the filter and be exposed to the filter mass, which is designed to absorb many contaminants, including toxic contaminants, that are not desirable in drinking water. As the water flows or is pushed through the filter mass, the clean water exits into a beverage container or storage reservoir placed beneath the reservoir and water filter. A force between about 1 psi and about 200 psi or other suitable pressure, preferably at least 25 psi, may be applied to the water to obtain minimum flow rate. The need to maintain a range of flow rate to maximize the desired exposure time required for absorption can be addressed in part through the addition of an additional piston that is spring loaded.

Advantages of the water filtration device include its size and portability, tow degree of maintenance, ease/cost of manufacture, ease/cost of assembly, accommodation for varying degrees of operator strength, and ease of use. Additionally, a sufficient flow of water can be obtained with sufficient facilitated pressure. Because of the quality of filtered water possible with the current invention, the water can be suitable for cooking, storing and sharing.

The device, other than the water filter material/mass, can be formed of stainless steel, aluminum, high quality plastics, for example including, but not limited to, poly(etherether ketone), polyethylene, polypropylene, polystyrene, polyvinyl chloride, polytetrafluoroethylene, and other thermoplastics and polymers. This is an improvement over the conventional art, which has used lower quality plastic that cannot withstand the pressure exerted within the current device, has been incapable of cleaning the exterior of the water filter during use, and has also used metals that are toxic and damaging in transport. The current invention meets a long felt but unresolved need for a size-efficient, portable, durable water filtration device that can pressurize water through a filter mass that may be unsuitable or incapable for use in the conventional art (e.g., because of the lack of pressure that is capable of being created in portable filtration devices of the conventional art).

If the pores of the filter mass used are small enough, for example by using carbon, ceramic, micro- and/or nano-membrane materials including but not limited to HFM, or microporous plastic, or a combination thereof then the device may qualify under NSF P231 Protocol, a certification which conventional portable water filtration devices cannot meet. Certain embodiments of the current invention that use these filter mass materials can fulfill the needs of travelers who have water that is presumed to be potable but that does not meet the standards of the traveler.

EXAMPLE

FIGS. 1-8 collectively show a hand-driven water filtration system, generally denoted by the reference numeral 10, according to an embodiment of the current invention. Referring to FIG. 1, being an external view of system 10, system 10 generally includes water reservoir 12, entry port 14, exit port 20, and piston 30. Entry port 14 may include entry port cover 16.

Water reservoir 12 has a distal end and a proximal end. Both the distal end and proximal end of water reservoir 12 may be open. The distal end of water reservoir 12 can be closed off by including filter frame 18 secured thereto (e.g., via threading) with exit port 20 disposed through filter frame 18. Exit port cap 22 may be secured on the distal end of filter frame 18 in order to close off exit port 20.

The proximal end of water reservoir 12 can also be closed off by including piston frame 24 and piston 30 disposed therethrough into the hollow interior of water reservoir 12. Covering 28 can be positioned on a proximal end of piston 30.

Feet 26 may be positioned along an exterior surface of water reservoir 12 in order to stabilize system 10 in a stationary position.

Figure 2:
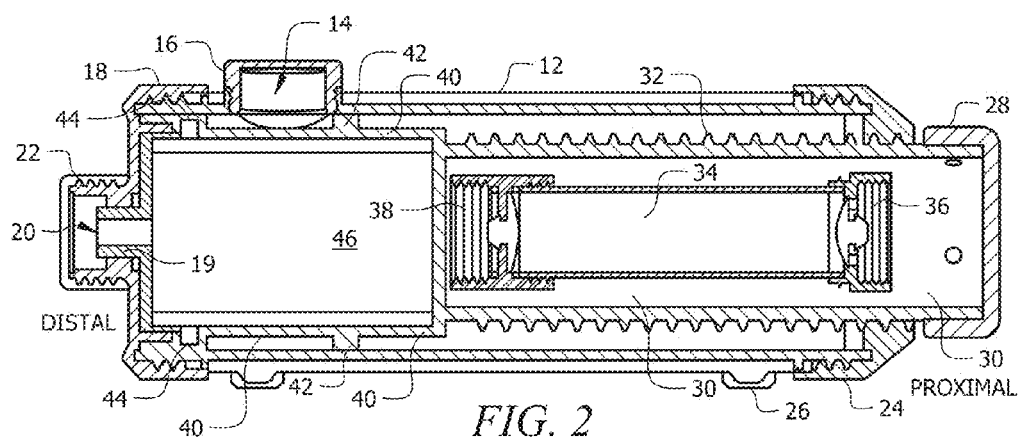
FIG. 2 is a side cross-sectional view of an embodiment of the current invention with piston in a compacted position.
Figure 3:
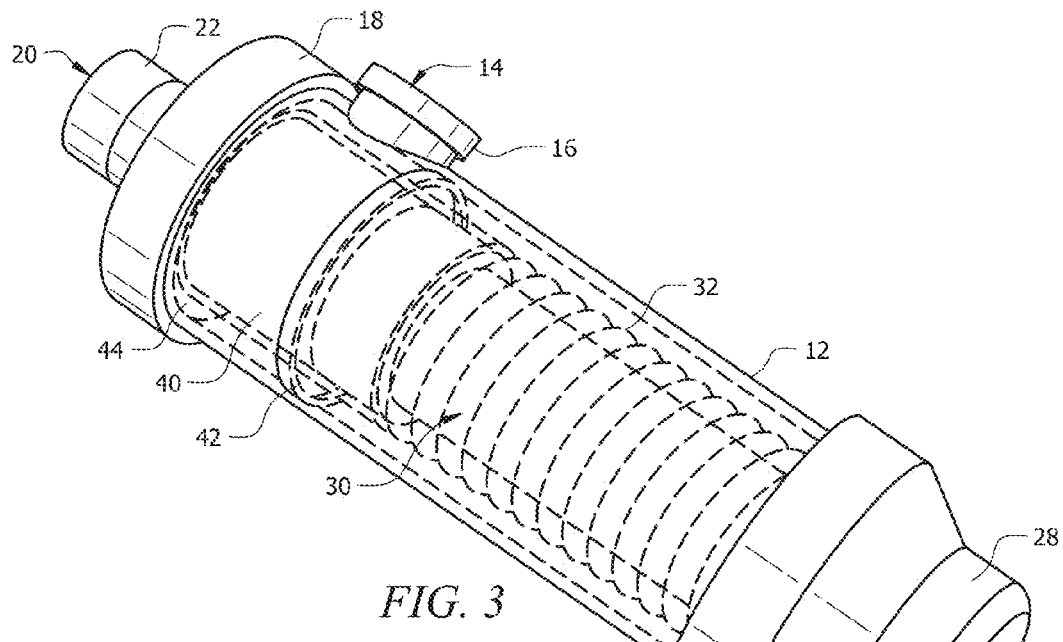
FIG. 3 is an external wireframe view of an embodiment of the current invention (with body shown) with piston in a compacted position.
Figure 4:
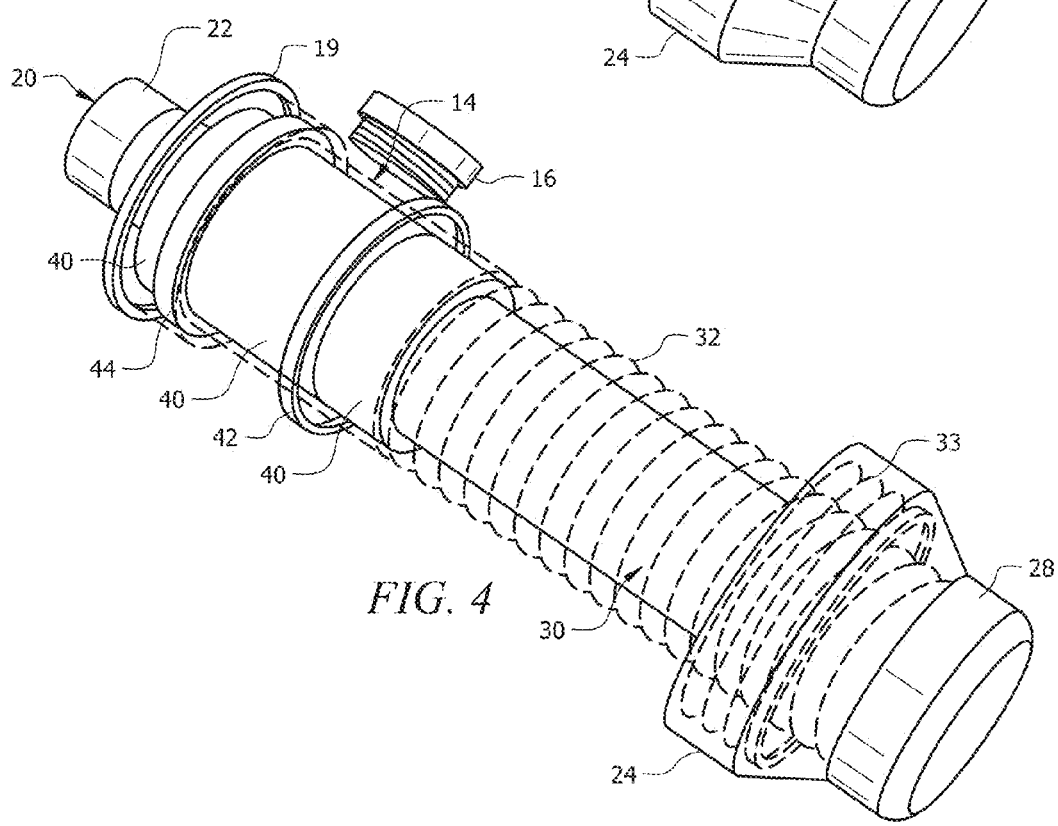
FIG. 4 is an internal wireframe view of an embodiment of the current invention (without body shown) with piston in a compacted position.
Figure 5:
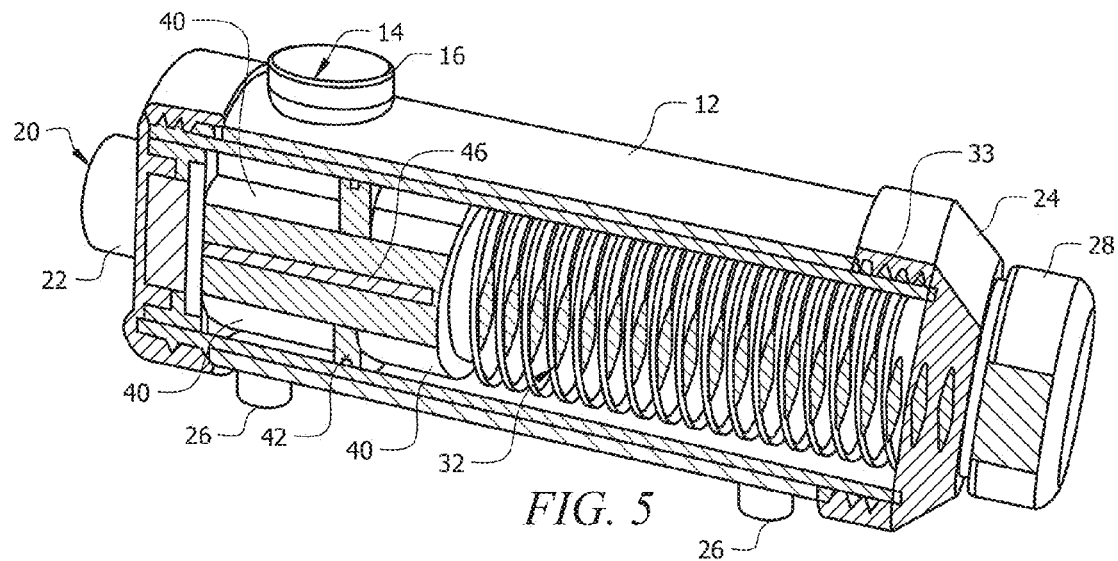
FIG. 5 is a perspective 90% cross-sectional view of an embodiment of the current invention with piston in a compacted position.
Figure 6:
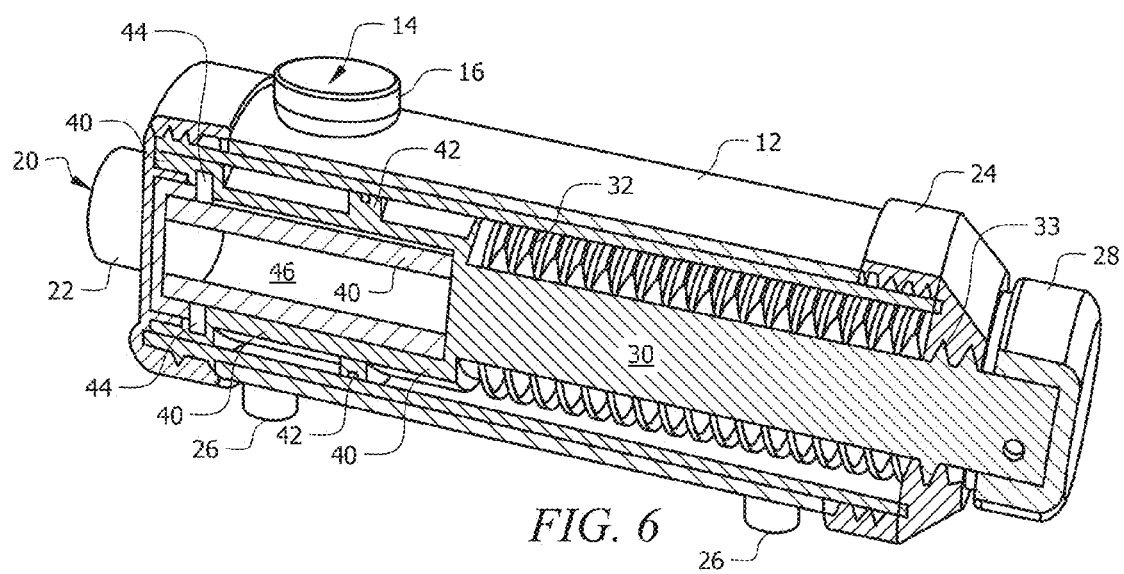
FIG. 6 is a perspective 75% cross-sectional view of an embodiment of the current invention with piston in a compacted position.

FIGS. 2-8 show system 10 from various perspectives, particularly the internal mechanics and components of system 10. Optionally, piston apparatus 30 can be substantially hollow in order to enclose or store one or more water filters (e.g., carbon blocks) 34, as seen in FIGS. 2 and 7, and would thus include an open top for access into the interior of piston apparatus 30. Threads or ribs 32 are disposed along the extent of the outer wall of piston apparatus 30. Threads or ribs are disposed near the proximal end of reservoir 12 (or alternatively, threads 33 along the inner wall of piston frame 24, as seen in FIG. 2) and are adapted to engage threads or ribs 32 disposed along the outer wall of piston apparatus 30.

Covering 28 is disposed in overlying relation to piston apparatus 30 to seal an additional water filter 34 from the external environment. Covering 28 is also fabricated to allow twisting or manipulation of piston apparatus 30. Covering 28 may be hollow or indented (e.g., hex fitting) to fit any lever or tool used to facilitate twisting of covering 28. Other embodiments may include a spring (i.e., stored potential energy used to twist covering 28), motor (i.e., powered/electric twisting), hydro-reactive pellets (i.e., pellet contacts water and expands, thereby twisting covering 28), carbon dioxide cartridge (i.e., gas-powered twisting), or other suitable method of manipulation or twisting of covering 28. Further examples can be seen in FIGS. 7-10 of U.S. Pat. No. 8,323,490, which is incorporated herein by reference in its entirety.

System 10 further includes sleeve 40 extending distally from a distal end of piston 30. Generally, sleeve 40 would have the shape of a cylinder but with an open distal end. The proximal end of sleeve 40 may be open or may be closed (e.g., in order to allow additional water filter 34 to be contained within hollow piston 30 and/or in order to facilitate forcing water through water filter 46). As seen in FIGS. 2 and 6-8, the inner diameter of sleeve 40 is slightly larger than the outer diameter of water filter 46, such that sleeve 40 can envelope water filter 46, at least along the length of water filter 46. Furthermore, the length of sleeve 40 can be similar to that of water filter 46, such that as piston apparatus 30 is threaded distally into water reservoir 12, sleeve 40 would cover or surround the proximal end and length of water filter 46 around the circumference of water filter 46 until the proximal edge of sleeve 40 reaches the proximal edge of water filter 46, as seen in FIGS. 2 and 5-7.

O-ring 42 is disposed around the circumference of sleeve 40, and accordingly has an inner diameter that is slightly larger than an outer diameter of sleeve 40. Alternatively, if O-ring 42 is positioned within an outer notch around sleeve 40, the outer diameter of O-ring 42 should at least be larger than the outer diameter of sleeve 40 so as to contact the inner walls of water reservoir 12. As piston apparatus 30 is threaded through the proximal end of water reservoir 12, the outer surface (having the outermost diameter) of O-ring 42 makes contact with the inner wall of reservoir 12. Contact between O-ring 42 and the inner wall of reservoir 12 seals the interior of reservoir 12 and prevents any fluid disposed therein from leaking proximally past O-ring 42 within reservoir 12 through any channel created between the inner wall of reservoir 12 and the outer wall of sleeve 40.

As covering 28 is twisted or manipulated, the threads of reservoir 12 (or piston frame 24) engage threads 32 of piston apparatus 30 along the outer extent of piston apparatus 30, and piston apparatus 30 is driven distally into the interior of reservoir 12 through the proximal end of reservoir 12. As piston apparatus 30 is driven distally, O-ring 42 disposed about the circumference of sleeve 40 maintains the seal preventing any water from entering any space proximal to O-ring 42 as O-ring 42 is driven distally down the interior of reservoir 12. The proximal end and inner walls of sleeve 40 contact water enclosed within reservoir 12 and compress the water, forcing the water distally toward the distal end of reservoir 12 and through water filter 46.

Also disposed about the inner circumference of sleeve 40 is a cleaning mechanism, denoted by the reference numeral 44. Cleaning mechanism 44 can be any suitable apparatus, such as a brush, scraper, or pad. In a particular embodiment, such as that seen in FIGS. 2-8, cleaning mechanism 44 can be disposed closer to the distal end of sleeve 40 and O-ring 42 can be disposed closer to the proximal end of sleeve 40, where their positions are relative to each other. Cleaning mechanism 44 has an outer diameter that is slightly smaller than an inner diameter of sleeve 40. Alternatively, if cleaning mechanism 44 is positioned within an inner notch on sleeve 40 (see FIGS. 2 and 6), the inner diameter of cleaning mechanism 44 should at least be smaller than the inner diameter of sleeve 40, so that cleaning mechanism 44 can contact water filter 46 as sleeve 40 traverses back and forth along water filter 46.

Figure 9:
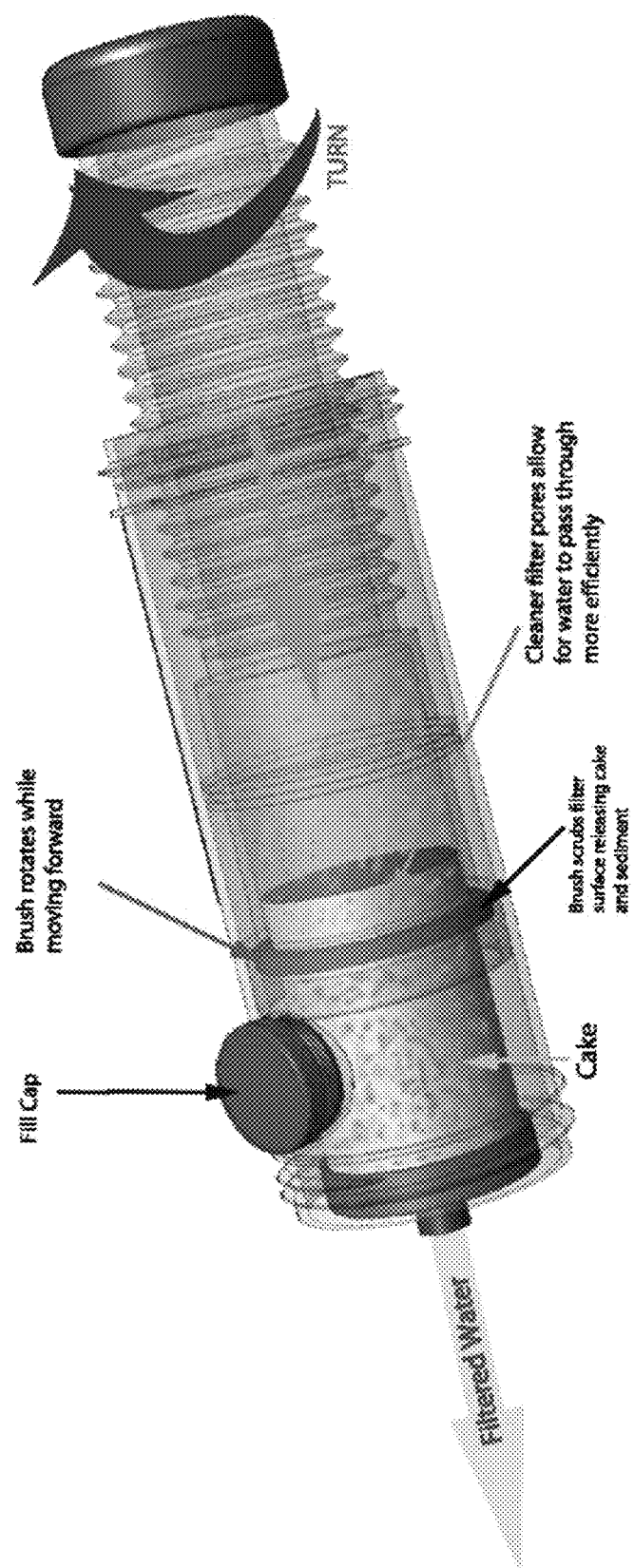
FIG. 9 depicts the mechanism of an embodiment of the current invention.

Methodologically, as can be seen in FIG. 9, as piston apparatus 30 is threaded distally through water reservoir 12 via the proximal end of water reservoir 12, sleeve 40 begins to surround water filter 46 (beginning with the proximal end of water filter 46), and as sleeve 40 continues distally, the inner surface (having the innermost diameter) of cleaning mechanism 44 contacts the outer surface of water filter 46 cleans the area that cleaning mechanism 44 contacts, specifically the outer surface of water filter 46 by brushing or scraping any solids that have plugged, accumulated, or caked onto the outer surface of water filter 46 passing unfiltered water through water filter 46. Thus, as piston apparatus 30 and sleeve 40 move back and forth within reservoir 12, cleaning mechanism 44 can continue to scrape and clean the outer surface of water filter 46. By removing this caked material from the outer surface of water filter 46, water filter 46 can continue to operate in a suitable manner. In the case of water filter 46 being formed of ceramic material, with the use of a sufficiently coarse material in cleaning mechanism 44, a very small amount of ceramic material can be removed from the outer surface of water filter 46 if an extensive cleaning is required.

In an embodiment where cleaning mechanism 44 is positioned about sleeve 40 in distal relation to O-ring 42 (see FIGS. 2, 4, 6, and 8), entry port 14 can be positioned therebetween when system 10 when disposed in a fully compact position (i.e., piston apparatus 30 is fully threaded within reservoir 12). Entry port 14 is an opening within an outer wall of reservoir 12, where fluid can enter system 10, in particular reservoir 12, specifically when system 10 is in a more expanded position (i.e., piston apparatus 30 is not fully threaded within reservoir 12 as it is in FIGS. 2-7; see FIG. 8 for the expanded position) and space is available within reservoir 12 for the fluid to fill. It is contemplated herein that any suitable method can be used for inducing fluid to flow through entry port 14 and into reservoir 12. Examples include, but are not limited to, pouring fluid through entry port 14, connecting a hose to entry port 14 or an inlet valve and retracting piston apparatus 30 to draw fluid into reservoir 12, submerging system 10 (including entry port 14) in fluid, and connecting entry port 14 to a pressurized water source and using water filter 46 as an inline filter where force is provided by the line pressure (not piston apparatus 30). In the last "inline filter" example, even though piston apparatus 30 is not providing the pressure to force fluid through water filter 46, cleaning mechanism 44 can still be used to clean water filter 46 while water is filtered, thus providing effective flow rate. Still further examples can be found in U.S. Pat. No. 8,323,490, which is incorporated herein by reference in its entirety.

In this particular embodiment, O-ring 42 should always be positioned in proximal relation to entry port 14, both when system 10 is in its most expanded position (see FIG. 8) and when system 10 is in its most compact position (see. FIGS. 2-4 and 6). Functionally, O-ring 42 and entry port 14 are structured and positioned in this manner relative to each other so that regardless of the position of system 10, influent fluid cannot flow proximally past O-ring 42 through entry port 14, as discussed previously. Thus, even if piston apparatus 30 is fully inserted into reservoir 12, fluid could not flow proximally past the sealing point between O-ring 42 and the contacted inner wall of reservoir 12 via a water source connected to entry port 14. As piston apparatus is retracted proximally from reservoir 12, space becomes available for the unfiltered fluid to fill. As seen in FIG. 8, this space is located within the interior of sleeve 40 and around the outside of sleeve 40 (but within reservoir 12) up until the sealing point between O-ring 42 and the contacted inner wall of reservoir 12.

As seen in FIGS. 2 and 7, water titter 46 is positioned within reservoir 12 and includes a distal end with an opening in the middle that would allow filtered water to flow therethrough and ultimately through exit port 20. As the water flows through and within the water filter 46, filtered water exits through exit port 20.

Filter frame 18 may include circular threaded extension 19 on its distal end (see FIGS. 2 and 7), where threaded extension 19 can engage a beverage container, such as a conventional water storage bottle or any readily available commercial water storage bottle, such as a NALGENE-brand bottle, or also engage a second water filter, such as additional filter 34 via threads 36. Additional filter 34 may be formed of carbon, ceramic, micro and/or nano-membrane materials including but not limited to HFM, micro-porous plastic or a combination thereof. The ability of system 10 to attach a second filter is beneficial in that influent "unfiltered water" can be filtered first through water filter 46 (e.g., formed of ceramic material) to remove turbidity and bacteria, thus cleaning the water to a level considered potable by many standards. Because this water has been "prefiltered" within device 10, as the "prefiltered water" can then pass through additional filter 34, which can have a lesser pore size, allowing the water to be filtered even further to remove additional bacteria and also viruses. This ability of system 10 to self-clean via cleaning mechanism 44 and filter the water through multiple stages can be paramount to achieving certification to the P231 protocol, if desired. It may be noted that filter media with smaller pores are more affected by turbid water, and as such, these smaller-pore media operate more effectively with pre-cleaned water.

Additional filter 34 may also include a set of threads 38 that can accommodate a conventional water storage bottle, such as that noted. The walls of circular threaded extension 19 may also include a valve, port or aperture (not shown) that facilitates the release of pressure prior to the purified water entering the water bottle or additional filter 34. Additionally, the filtered water could be stored in a cistern or storage container, such a five-gallon jug.

Water filter 46 is enclosed within reservoir 12 at the distal end of reservoir 12, as seen in FIGS. 2-4 and 6-8. Filter frame 18 is disposed in distal relation to water filter 46 and the open base of reservoir 12. Filter frame 18 has a threaded extension along its proximal edge adapted to receive the distal threads of reservoir 12 (see FIG. 2) and as such can be secured to the distal end of reservoir 12 via tight threading (see FIG. 2) or other means of connection. When filter frame 18 and reservoir 12 are interconnected (and possibly sealed via O-ring 42, see FIG. 4), water contacts water filter 46 and is forced through the top and side surfaces of water filter 46 as piston apparatus 30 and sleeve 40 are driven distally, indicated by the proximal-to-distal arrows reference numeral 45) in FIG. 8.

Exit port 20 is created by a break or opening in the middle of filter frame 18, as seen in FIGS. 2 and 7, where the opening in filter frame 18 is lined up with the previously-discussed opening in the distal end of water filter 46. As the fluid flows through and within water filter 46, the filtered water is forced into and exits through exit port 20.

Water filter 46 can be formed of any suitable filtration material (e.g., carbon, ceramic, micro- and/or nano-membrane materials including but not limited to HFM, micro-porous plastic, or any combination thereof) and include any suitably sized pores (e.g., 0.5 to 0.01 µm). Filter frames, water filters, and/or filter media may be interchangeable. For example, carbon blocks may be suitable for use in the U.S., whereas ceramic blocks or micro- and/or nano-membrane materials including but not limited to HFM may be desired for use internationally or as a means of emergency water supply filtration if potable water is not available due to disaster or other municipal or residential supply issue. As water filtration system 10 is upsized for use in large volume filtration in a portable environment, it can be appreciated that additional materials may be required to strengthen the device for a more industrial classification (e.g., stainless steel tank and metal fittings).

Water filtration system 10 may further include exit port cap 22 coupled to threaded extension 19 on the distal end of filter frame 18 in order to protect threaded extension 19, exit port 20, and water filter 46 within reservoir 12.

Optionally, a piston jacket (not shown may be disposed in overlying and outer relation to piston apparatus 30 for visual and protective purposes. A notch (not shown) may be disposed along the bottom portion or bottom edge of piston jacket. The notch would fit into a cavity (not shown) formed near a distal end of reservoir 12. When the notch of the piston jacket engages the cavity of reservoir 12, a contiguous barrier is formed around the substantial entirety of piston apparatus 30 and reservoir 12. When piston jacket is removed, it may be used also as a beverage container for the filtered water.

Optionally, each component of water filtration system 10 (e.g., filter frame 20, piston frame 24, covering 28, etc) can be removable, as seen most clearly in FIGS. 2 and 7, for example by threaded connections, such that each component can be cleaned and/or replaced, as necessary.

GLOSSARY OF CLAIM TERMS

Brush or scrape: This term is used herein to refer to any methodologies of cleaning the exterior surface of a water filter by the cleaning mechanism.

Caking: This term is used herein to refer to a layer of material formed by accumulation of solids caught against a filter media.

Circumference: This term is used herein to refer to the perimeter of a circle. An annular structure can have an "inner circumference" that is the distance of the circle along the inner perimeter of the annular structure; the "outer structure" is the distance of the circle along the outer perimeter of the annular structure.

Cleaning mechanism: This term is used herein to refer to any apparatus that can brush, scrape or otherwise clean the exterior surface of a water filter. Examples include, but are not limited to, brushes, scrapers, and pads. The cleaning mechanism is typically disposed along the inner circumference of the sleeve, from a thin apparatus to an apparatus that extends the length of the sleeve.

Covering: This term is used herein to refer to any structure that closes or seals an opening from the external environment. A "covering" may be removable or permanent, and may facilitate twisting of the structure to which it is coupled.

Cylindrical: This term is used herein to refer to the shape of a cavity or chamber in a mechanism, such as the counterpart to a piston. Thus, a piston can be telescopically received within the "cylindrical" interior of the chamber.

Distal: This term is used herein to refer to a position or a direction of movement that is closer or relative to an exit port in the filtration system. For example, a piston can move distally when it is threaded into the water reservoir toward the exit port. In this case, a distal movement of the piston presumably applies a higher amount of pressure applied to the fluid contained within the reservoir. As another example, the distal end of a component is the end of the component closer to the exit port of the filtration system.

Extent: This term is used herein to refer to a range or surface of a structure along the longitudinal axis of that structure. Thus, the extent of a cylinder (e.g., piston) can be the outer or inner length of the wall of the cylinder.

Filter frame: This term is used herein to refer to a frame structure adapted to fit the reservoir in distal relation to the water filter in order to maintain the position of the water filter.

Fluid: This term is used herein to refer to any substance that can flow and/or take the relative shape of its container. A "fluid" can be a liquid or gas, most typically water in the current invention.

Force: This term is used herein to refer to driving a material or fluid through another material. For example, if water is "forced" through a filter mass, it is driven through the filter mass by some external pressure.

Hollow: This term is used herein to refer to the characteristic of a solid structure having an empty space or cavity within its interior.

Influent: This term is used herein to refer to water flowing into the water filtration system.

Impermeable: This term is used herein to refer to the characteristic of a structure to prevent the passage of a fluid. Thus, if the walls of a cylinder are "impermeable", the walls should prevent the passage of a fluid, such as liquid or gas.

Inner extent: This term is used herein to refer to the interior aspect of a structure along the longitudinal axis of that structure. Thus, the "inner extent" of a cylinder (e.g., water reservoir) can be the inside surface of the wall of the cylinder.

Male-female relationship: This term is used herein to refer to an association between two components of an apparatus, where the "male" component is inserted through the "female" receptacle. For example, a water filter can be a male component and a cleaning mechanism can be a female component, such that the water filter enters the interior of the cleaning mechanism as the piston apparatus and sleeve are threaded distally in the water reservoir.

Open: This term is used herein to refer to the characteristic of a side of a structure being accessible, unimpeded or not closed. Thus, a cylinder with an "open" top has an interior that is accessible through the top.

Partially: This term is used herein to refer to a piston disposed to some extent within the interior of a water reservoir.

Piston apparatus: This term is used herein to refer to a cylinder or valve that fits inside a hollow cylindrical vessel and moves within the vessel under pressure. For example, when pressure is applied to a piston threaded within a water reservoir, this "piston" can be threaded further into the interior of the reservoir.

Port: This term is used herein to refer to an opening where a connection can be made between two structures on either side of the opening. For example, an "exit port" can provide a pathway for filtered water to flow from a water filter to a storage container or other apparatus outside of the filtration system. As another example, an "entry port" can provide a pathway for unfiltered fluid to flow from an external environment into the interior of the water reservoir for subsequent filtration.

Proximal: This term is used herein to a position or a direction of movement that is closer or relative to an end-user or the piston covering in the filtration system (if the piston covering is present as in the figures). For example, a piston can move proximally when it is threaded out of the water reservoir toward the end-user or away from the exit port. In this case, a proximal movement of the piston presumably decreases the amount of pressure applied to the fluid contained within the reservoir. As another example, the proximal end of a component is the end of the component furthest from the exit port of the filtration system or closest to the end-user.

Proximal-distal direction: This term is used herein to refer to a path of travel of a piston apparatus from a proximal end of the filtration system to a distal end of the filtration system, and vice versa, such that the piston apparatus is structured to and capable of traveling back and forth in this direction within the water reservoir.

Seal off: This term is used herein to refer to a structure physically contacting another structure, such that the contact between the two structures prohibits the flow of a fluid between the two structures. Thus, when a piston apparatus has "sealing contact" with the walls of a vessel, a fluid cannot flow between the piston and vessel.

Sealing mechanism: This term is used herein to refer to any apparatus that can be used to provide a sealing effect between two structures. An example of a sealing mechanism is an O-ring that has sealing contact with a reservoir in order to seal off the space on each side of the O-ring from any leaks.

Sleeve: This term is used herein to refer to a casing connected to the piston apparatus and extending distally from the piston apparatus, where the sleeve has an open distal end that begins to surround the water filter as the piston apparatus or sleeve is threaded distally within the water reservoir.

Threads: This term is used herein to refer to ridges or tugs used to provide an effective seal and to facilitate the downward movement of a piston within a vessel to pressurize the interior of the vessel. When a user engages the "threads" of the piston and the "threads" of the reservoir, the piston can move further into or out of the reservoir and increase or decrease pressure, respectively, within the reservoir.

Water filter: This term is used herein to refer to a structure that facilitates the separation of suspended, dissolved, or particular matter from a fluid, in particular water. The "water filter" can include a filter mass, filter enclosure, filter frame or other structure that positions the water filter to receive the fluid.

Water filter: This term is used herein to refer to any structure or shape formed of a filtration material, for example carbon, ceramic, HFM, micro-porous plastic, or any combination thereof. The filter mass enables separation of suspended, dissolved, or particular matter from a fluid, in particular water. Combinations of substances include, fir example, mixtures (e.g., multiple filtration materials, nutrients for taste, etc.) or multi-level (i.e., stacked) masses.

Water reservoir: This term is used herein to refer to a vessel in which water can be received. The "water reservoir" can also threadably receive a piston within its hollow interior.

It will thus be seen that the Objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A water filtration system, comprising:
   a substantially hollow water reservoir having a substantially impermeable wall, an open top, and an open bottom;
   an entry port leading from an environment external to said water reservoir for supplying a fluid into an interior of said water reservoir;
   a cylindrical piston apparatus at least partially disposed within said water reservoir through said open top of said water reservoir, said piston apparatus having a proximal end and a distal end;
   a first plurality of threads disposed at least partially along an extent of said piston apparatus and threadably engaging a second plurality of threads that allows said piston apparatus to move in a proximal-distal direction;
   a substantially hollow sleeve attached to said distal end of said piston apparatus and extending distally from said piston apparatus, wherein said sleeve moves simultaneously with said piston apparatus in said proximal-distal direction;
   said sleeve having an open distal end;
   a water filter positioned along said open bottom of said water reservoir, said sleeve having a diameter or width that is larger than a diameter or width of said water filter, such that as said piston apparatus and said sleeve move distally, said water filter enters an interior of said sleeve through said open distal end of said sleeve
   a cleaning mechanism disposed along an inner extent of said sleeve, such that said cleaning mechanism can brush or scrape an outer extent of said water filter when said sleeve travels distally down said outer extent of said water filter,
   wherein said cleaning mechanism and said water filter have a male-female relationship, where said cleaning mechanism is the female of said relationship and said water filter is the male of said relationship;
   an exit port extending from and in fluid communication with said water filter, said exit port leading to an environment external to said water filtration system,
   wherein pressure on said fluid can be increased or decreased by engaging said first plurality of threads and said second plurality of threads, such that an increase of said pressure on said fluid drives said fluid distally through said water filter.

2. A water filtration system as in claim 1, further comprising:
   said cleaning mechanism disposed around an inner circumference of said sleeve, such that said cleaning mechanism would brush or scrape an external surface of said water filter.

3. A water filtration system as in claim 1, further comprising:
   said cleaning mechanism having a length that is smaller than a length of said water filter.

4. A water filtration system as in claim 1, further comprising:
   a filter frame positioned in distal relation to said water filter for securing said water filter within said water reservoir, said filter frame having an aperture aligned with said exit port to allow filtered water to exit said water filtration system.

5. A water filtration system as in claim 4, further comprising:
   said filter frame being removable from said distal end of said water reservoir to allow said water filter to be removed from said water reservoir.

6. A water filtration system as in claim 4, further comprising:
   said filter frame including a circular threaded extension extending distally from said filter frame.

7. A water filtration system as in claim 1, further comprising:
   said piston apparatus being substantially hollow and structured to enclose an additional water filter.

8. A water filtration system as in claim 1, further comprising:
   a piston frame secured to said proximal end of said water reservoir, said piston frame including said second plurality of threads that threadably engages said first plurality of threads on said piston apparatus.

9. A water filtration system as in claim 8, further comprising:
   said piston frame being removable from said proximal end of said water reservoir in order to allow said piston apparatus to be removed from said water reservoir.

10. A water filtration system as in claim 1, further comprising:
    a sealing mechanism disposed around an outer circumference of said sleeve to seal off a space in said water reservoir proximal to said sealing mechanism.

11. A water filtration system as in claim 10, further comprising:
    said sealing mechanism disposed in proximal relation to at least a portion of said cleaning mechanism along said sleeve.

12. A water filtration system as in claim 10, further comprising:
    said entry port positioned in distal relation to said sealing mechanism such that said fluid can enter said interior of said water reservoir through said entry port but cannot pass through said sealing mechanism into said space in said water reservoir proximal to said sealing mechanism.

13. A water filtration system as in claim 10, further comprising:
    said sealing mechanism being an O-ring secured to and disposed around said outer circumference of said sleeve.

14. A water filtration system as in claim 1, further comprising:
    said cleaning mechanism being an annular brush, scraper, or pad disposed around said inner circumference of said sleeve.

15. A water filtration system as in claim 13, further comprising:
    said cleaning mechanism being an annular brush, scraper, or pad disposed around said inner circumference of said sleeve distal to said O-ring, and
    said entry port being positioned between said cleaning mechanism and said O-ring along said wall of said water reservoir.

16. A water filtration system, comprising:
    a substantially hollow water reservoir having a substantially cable wall, an open top, and an open bottom;
    an entry port leading from an environment external to said water reservoir for supplying a fluid into an interior of said water reservoir;

a cylindrical piston apparatus at least partially disposed within said water reservoir through said open top of said water reservoir, said piston apparatus having a proximal end and a distal end;

a first plurality of threads disposed at least partially along an extent of said piston apparatus and threadably engaging a second plurality of threads that allows said piston apparatus to move in a proximal-distal direction;

a substantially hollow sleeve attached to said distal end of said piston apparatus and extending distally from said piston apparatus, wherein said sleeve moves simultaneously with said piston apparatus in said proximal-distal direction;

said sleeve having an open distal end;

a water filter positioned along said open bottom of said water reservoir, said sleeve having a diameter or width that is larger than a diameter or width of said water filter, such that as said piston apparatus and said sleeve move distally, said water filter enters an interior of said sleeve through said open distal end of said sleeve, said piston apparatus being substantially hollow and structured to enclose an additional water filter;

a cleaning mechanism disposed along an inner extent of said sleeve, such that said cleaning mechanism can brush or scrape an outer extent of said water filter when said sleeve travels distally down said outer extent of said water filter, said cleaning mechanism disposed around an inner circumference of said sleeve, such that said cleaning mechanism would brush or scrape around an outer circumference of said water filter, said cleaning mechanism having a length that is smaller than a length of said water filter, wherein said cleaning mechanism and said water filter have a male-female relationship, where said cleaning mechanism is the female of said relationship and said water filter is the male of said relationship;

an exit port extending from and in fluid communication with said water filter, said exit port leading to an environment external to said water filtration system;

a filter frame positioned in distal relation to said water filter for securing said water filter within said water reservoir, said filter frame having an aperture aligned with said exit port to allow filtered water to exit said water filtration system, said filter frame being removable from said distal end of said water reservoir to allow said water filter to be removed from said water reservoir, said filter frame including a circular threaded extension extending distally from said filter frame;

a piston frame secured to said proximal end of said water reservoir, said piston frame including said second plurality of threads that threadably engages said first plurality of threads on said piston apparatus, said piston frame being removable from said proximal end of said water reservoir in order to allow said piston apparatus to be removed from said water reservoir;

a sealing mechanism disposed around an outer circumference of said sleeve to seal off a space in said water reservoir proximal to said sealing mechanism, said sealing mechanism disposed proximal to at least a portion of said cleaning mechanism along said sleeve, said entry port positioned distal to said sealing mechanism such that said fluid can enter said interior of said water reservoir through said entry port but cannot pass through said sealing mechanism into said space in said water reservoir proximal to said sealing mechanism, said sealing mechanism being an O-ring secured to and disposed around said outer circumference of said sleeve, said cleaning mechanism being an annular brush, scraper, or pad disposed around said inner circumference of said sleeve distal to said O-ring, said entry port being positioned between said cleaning mechanism and said O-ring along said wall of said water reservoir, wherein pressure on said fluid can be increased or decreased by engaging said first plurality of threads and said second plurality of threads, such that an increase of said pressure on said fluid drives said fluid distally through said water filter.

\* \* \* \* \*

UNITED STATES PATENT AND TRADEMARK OFFICE
CERTIFICATE OF CORRECTION

| | | |
|---|---|---|
| PATENT NO. | : 9,022,223 B1 | Page 1 of 1 |
| APPLICATION NO. | : 14/599046 | |
| DATED | : May 5, 2015 | |
| INVENTOR(S) | : William Scott Wright | |

It is certified that error appears in the above-identified patent and that said Letters Patent is hereby corrected as shown below:

In the Claims,

Column 16, Claim 16, Line 64 should read:

tially impermeable wall, an open top, and an open bottom;

Signed and Sealed this
Twenty-fifth Day of August, 2015

Michelle K. Lee
*Director of the United States Patent and Trademark Office*